United States Patent
Rose

(10) Patent No.: US 7,298,703 B1
(45) Date of Patent: Nov. 20, 2007

(54) HYSTERESIS METHOD FOR REDUCING CONTROL CODE TRANSMISSION BETWEEN A LINE CARD AND A SWITCHING FABRIC

(75) Inventor: Kenneth M. Rose, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1221 days.

(21) Appl. No.: 10/210,149

(22) Filed: Jul. 31, 2002

Related U.S. Application Data

(63) Continuation-in-part of application No. 09/978,475, filed on Oct. 16, 2001.

(51) Int. Cl.
  *H04L 12/54* (2006.01)
  *H04L 12/64* (2006.01)

(52) U.S. Cl. .......... 370/236; 370/230.1; 370/255; 370/358; 370/416; 370/429

(58) Field of Classification Search ........ 370/230–232, 370/235, 236, 254, 255, 357–358, 360, 412, 370/415, 416, 419, 428, 429
See application file for complete search history.

(56) References Cited

U.S. PATENT DOCUMENTS

| | | | |
|---|---|---|---|
| 3,775,566 A | 11/1973 | Akimaru et al. .......... 179/18 |
| 5,179,552 A | 1/1993 | Chao | |
| 5,197,064 A | 3/1993 | Chao | |
| 5,361,255 A | 11/1994 | Diaz et al. | |
| 5,539,747 A | 7/1996 | Ito et al. .......... 370/235 |
| 5,673,253 A | 9/1997 | Shaffer .......... 370/229 |
| 6,091,729 A | 7/2000 | Dove .......... 370/395 |
| 6,094,692 A * | 7/2000 | Kalkunte .......... 710/34 |
| 6,122,251 A | 9/2000 | Shinohara .......... 370/231 |
| 6,147,997 A | 11/2000 | Holden et al. .......... 370/395.1 |
| 6,157,643 A | 12/2000 | Ma .......... 370/389 |
| 6,167,030 A * | 12/2000 | Kilkki et al. .......... 370/236 |
| 6,356,548 B1 | 3/2002 | Nellenbach et al. .......... 370/362 |
| 6,636,949 B2 | 10/2003 | Barroso et al. .......... 711/141 |
| 6,700,869 B1 * | 3/2004 | Falco et al. .......... 370/230 |
| 6,715,007 B1 * | 3/2004 | Williams et al. .......... 710/52 |
| 6,732,209 B1 * | 5/2004 | Cherukuri et al. .......... 710/240 |
| 6,839,768 B2 * | 1/2005 | Ma et al. .......... 709/235 |
| 6,937,568 B1 * | 8/2005 | Nicholl et al. .......... 370/236 |
| 7,068,602 B2 * | 6/2006 | Davari et al. .......... 370/232 |
| 7,072,299 B2 * | 7/2006 | Bass et al. .......... 370/235 |
| 7,145,904 B2 * | 12/2006 | Zhao et al. .......... 370/371 |

(Continued)

*Primary Examiner*—Chi Pham
*Assistant Examiner*—Ahmed Elallam
(74) *Attorney, Agent, or Firm*—Campbell Stephenson LLP

(57) ABSTRACT

Disclosed is a circuit and method for reducing control code transmission between a line card and a switching fabric. One embodiment includes a memory receiving (and storing) data transmitted at a second rate during a first period of time. A quantity of data in the memory at time t, q(t), is compared with first, second, third, and fourth quantity values. The memory may receive data transmitted at the first rate if q(t) is less than the second, third and fourth values but greater than the first value. The memory may receive data transmitted at the third rate if q(t) is greater than the first, second, and third values but less than the fourth value. The memory may receive data transmitted at the second rate if q(t) is greater than the first and second values but less than the third and fourth values.

23 Claims, 8 Drawing Sheets

U.S. PATENT DOCUMENTS

| | | | |
|---|---|---|---|
| 2002/0057712 A1 | 5/2002 | Moriwaki et al. | 370/463 |
| 2003/0007452 A1* | 1/2003 | Gorti et al. | 370/229 |
| 2003/0035373 A1* | 2/2003 | Bass et al. | 370/230.1 |
| 2003/0128703 A1* | 7/2003 | Zhao et al. | 370/392 |
| 2003/0165150 A1* | 9/2003 | Zimmerman et al. | 370/412 |
| 2003/0231593 A1* | 12/2003 | Bauman et al. | 370/235 |
| 2004/0004961 A1* | 1/2004 | Lakshmanamurthy et al. | 370/364 |
| 2004/0085967 A1 | 5/2004 | Boduch et al. | 370/395.42 |

* cited by examiner

HYSTERESIS METHOD FOR REDUCING CONTROL CODE TRANSMISSION BETWEEN A LINE CARD AND A SWITCHING FABRIC

RELATED APPLICATION

This application is a continuation in part and claims priority to patent application Ser. No. 09/978,475, filed Oct. 16, 2001, pending.

BACKGROUND OF THE INVENTION

Local switching networks (e.g., a switching network contained within an office building) may include a switching fabric coupling end devices via line cards. The term switching fabric is a term that describes a distributed switching matrix that establishes a circuit through which data may be transmitted between end devices. A switching fabric may include a stored program control that seeks out a suitable combination of time-slots and multiplexed highways to establish the circuit between the end devices. Multiple highways can co-exist simultaneously being exclusive from/to end devices. The term end device may include desktop computers, printers, routers, or other networking equipment, etc.

FIG. 1a illustrates, in block diagram form, an exemplary local switching network 100. Local switch network 100 includes a switching fabric 102 (e.g., a cross-bar switching fabric) coupled to line cards 104 through 108. Each of the line cards may be coupled to one or more end devices or other networks. FIG. 1a shows line card 104 coupled to end devices 110 through 114 via common bus 140, line card 106 coupled to end devices 116 through 120 via common bus 142, and line card 108 coupled to end devices 122 through 126 via common bus 144.

The local switching network 100 shown in FIG. 1a may employ one of many different communication protocols enabling data communication between one or more end devices 110 through 126 via line cards 104 through 108 and switching fabric 102. FIG. 1a will be described with reference to a communications protocol in which end devices communicate by transferring data frames or packets to each other via line cards and the switching fabric. Each data packet includes one or more lines of data. The lines of the data packet may be transmitted during consecutive data transmission cycles of the link between the line card and the switching fabric. Lines of the data packet may also be transmitted during non-consecutive transmission cycles of the link between the line card and the switching fabric. Line cards 104 through 108 are coupled to switching fabric 102 via one or more data links. In FIG. 1a, line card 104 is coupled switching fabric 102 via downlink and uplink 128 and 130, respectively, line card 106 is coupled switching fabric 102 via downlink and uplink 132 and 134, respectively, and line card 108 is coupled switching fabric 102 via downlink and uplink 136 and 138, respectively.

FIG. 1b illustrates in block diagram form, relevant portions of a line card 104. As shown in FIG. 1b, line card 104 includes a receiving data buffer 150, a formatter 152, a control circuit 154, and a multiplexer 156. Multiplexer 156 selectively couples an output of formatter 152 and common bus 140 to uplink 130 in response to a control signal generated by control circuit 154. Formatter generates control codes to be transmitted to switching fabric 102. Control circuit 154 couples the output of formatter 152 to uplink 130 in response to formatter generating a control code. Otherwise, control circuit 154 couples common bus 140 to uplink 130 thereby allowing data to be transmitted to switching fabric 102. It is noted that the contents of packets received by line cards are optionally modified by a separate formatter (not shown) before being sent through the multiplexer 156 to fabric 102. For example, the contents of first lines of selected packets may be modified before passing through the multiplexer 156.

Data buffer 150 typically is a first in first out (FIFO) buffer. Buffer 150 is configured to receive and store lines of data received from switching fabric 102 via downlink 128. The data is stored within buffer 150 until it is transmitted to one of the end devices 110 through 114 (not shown in FIG. 1b) via common bus 140. Common bus 140 may take form in a bi-directional bus. In this embodiment, a switch may be provided (not shown) for selectively coupling the data buffer 150 or the multiplexer 156 to the bi-directional bus. In the alternative, common bus 140 may take form in a pair of unidirectional buses respectively coupled to buffer 150 and multiplexer 156.

Formatter 152 provides a plurality of functions. One function is to monitor buffer 150. Often times, buffer 150 cannot output data to end devices 110 through 114 as fast as data is input to buffer 150 from switching fabric. In this situation, buffer 150 may completely fill as new data is sent from switching fabric 102 for storage therein. Because the buffer has no room for storing the new data, the new data may be lost.

Formatter 152 monitors the quantity of data stored in buffer 150 on an ongoing basis. To this end, formatter 152 receives information from data buffer 150 which identifies the quantity of data stored therein. Formatter compares this data against a single programmable threshold value (e.g., 80% of the full storage capacity of buffer 150). If the quantity of data stored in buffer 150 exceeds this threshold value, formatter 152 generates a stop-transmit control code instructing the switching fabric 102 to stop transmitting data for storage in buffer 150. Once generated, the stop-transmit control code is transmitted to switching fabric via multiplexer 156 and uplink 130. The switching fabric 102 stops sending data to line card 104 for storage in buffer 150 in response to receiving the stop-transmit control code, thereby decreasing the chances of buffer 150 overflow. However, it is noted that switching fabric may continue to send new data to line card 104 until the switching fabric receives the stop-transmit control code.

As buffer 150 outputs data to one of the end devices 110 through 114 while the switching fabric is in stop-transmit mode of operation, the quantity of data stored therein will decrease. Once formatter 152 detects that the contents of buffer 150 is below the single programmable threshold value, formatter 152 will generate a start-transmit control code instructing the switching fabric 102 to again start transmitting data to line card 104. The start-transmit control code is transmitted to switching fabric 102 via multiplexer 156 and uplink 130. When the start-transmit control code is received by the switching fabric 102, switching fabric starts to transmit data at the full rate to line card 104 for storage in buffer 104.

Thus, in the system shown in FIGS. 1a and 1b, data transmitted by switching fabric 102 is controlled by a simple stop/start control code received from formatter 152; either data is received within data buffer 150 at the full data transmit rate or no data is received at all. The above described method of monitoring buffers in line cards should not to be considered prior art to the claims herein.

SUMMARY OF THE INVENTION

Disclosed is a circuit and method for reducing control code transmission between a line card and a switching fabric. In one embodiment, the method includes a first memory receiving and storing data transmitted by a data transmitting device at a first data transmit rate during a first period of time. The second data transmit rate is greater than a third data transmit rate but less than a first data transmit rate. Comparing q(t), a quantity of data in the first memory at time t, with first, second, third, and fourth data quantity values wherein first data quantity value is less than the second, third, and fourth data quantity values, wherein the second data quantity value is less than the third and fourth data quantity values, and wherein the third data quantity is less than the fourth data quantity value. Thereafter, the first memory may receive and store data transmitted by the transmitting device at the first data transmit rate if q(t) is determined to be less than the second, third and fourth data quantity values but greater than the first data quantity value. The first memory may receive and store data transmitted by the transmitting device at the third data transmit rate if q(t) is determined to be greater than the first, second, and third data quantity values but less than the fourth data quantity value. The first memory may receive and store data transmitted by the transmitting device at the second data transmit rate if q(t) is determined to be greater than the first and second data quantity values but less than the third and fourth data quantity values. The second data quantity value stored in memory may be replaced with a new second data quantity value if q(t) is determined to be less than the second, third and fourth data quantity values but greater than the first data quantity value. The third data quantity value stored in memory may be replaced with a new third data quantity value if q(t) is determined to be greater than the first second, and third data quantity values but less than the fourth data quantity value.

BRIEF DESCRIPTION OF THE DRAWINGS

The present invention may be better understood, and it's numerous objects, features and advantages made apparent to those skilled in the art by referencing the accompanying drawings. The use of the same reference number throughout the figures designates a like or similar element.

FIG. 1b illustrates, in block diagram form, an exemplary line card employed in the local switching network of FIG. 1a;

FIG. 2b illustrates, in block diagram form, an exemplary line card employed in the local switching network of FIG. 2a;

FIG. 2c illustrates, in block diagram form, an exemplary line card employable in the local switching network of FIG. 1a;

FIG. 3a illustrates, in block diagram form, an exemplary formatter employed in the line card of FIG. 2a;

FIG. 3b illustrates, in block diagram form, an exemplary formatter employed in the line card of FIG. 2a;

FIG. 4a is a flow chart illustrating operational aspects of the formatter shown in FIG. 3a;

Figure 1A:
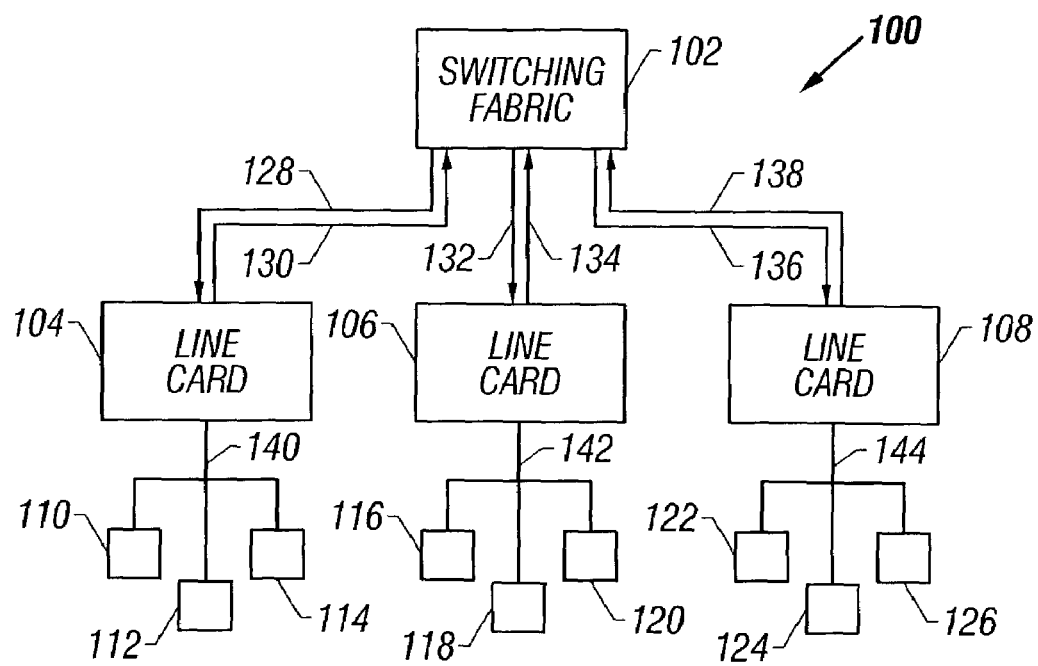
FIG. 1a illustrates, in block diagram form, an exemplary local switching network.
Figure 1B:
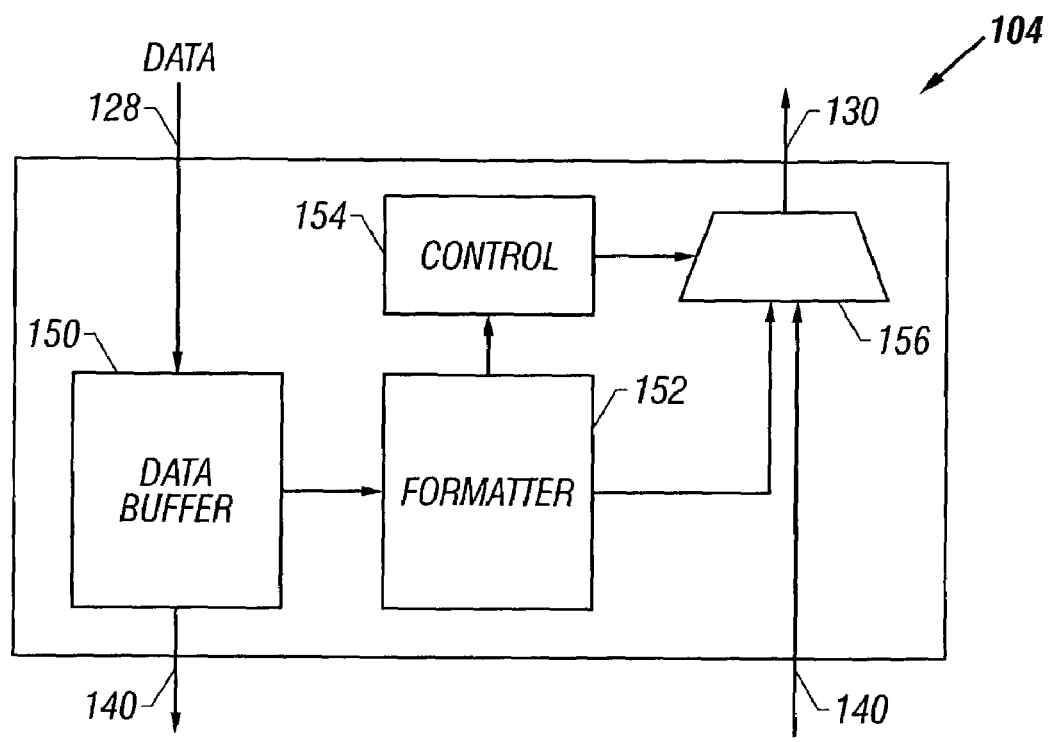

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the spirit and scope of the present invention as defined by the appended claims.

DETAILED DESCRIPTION

Figure 2A:
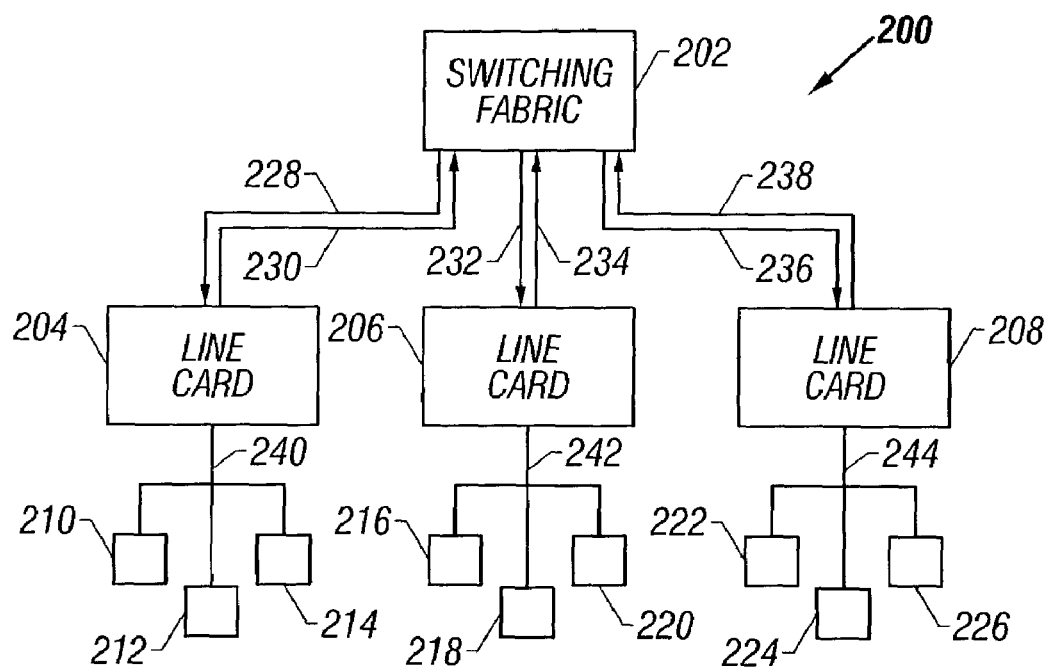
FIG. 2a illustrates, in block diagram form, an exemplary local switching network employing the present invention.

FIG. 2a illustrates, in block diagram form, a local switching network 200 employing the present invention. Local switch network 200 includes a switching fabric 202 (e.g., a cross-bar switching fabric) coupled to line cards 204 through 208. Line card 204 is coupled to end devices 210 through 214, line card 206 is coupled to end devices 216 through 220, and line card 208 is coupled to end devices 224 through 226.

Devices or circuits can be coupled together either directly, i.e., without any intervening device or circuit, or indirectly, with one or more intervening devices or circuits. As used herein the term connected devices or circuits means two or more devices or circuits directly connected together without any intervening device or circuit via one or more conductors, links, transmission lines, etc. The term coupled includes the term connected within its definition.

The local switching network 200 shown in FIG. 2a may employ one of many different communication protocols enabling data communication between one or more end devices 210 through 226 via line cards 204 through 208 and switching fabric 202. FIG. 2a will be described with reference to a communications protocol in which end devices communicate with each other by transferring data frames or packets via line cards and the switching fabric. It is noted end devices (e.g., end devices 210 and 212) can locally communicate with each other without having to transmit data packets via fabric 202. The present invention will be described with reference to end devices communicating with each other via fabric 202.

Each data packet in a data communication includes one or more lines of data. The lines of the data packet may be transmitted during consecutive data transmission cycles of the link between the line card and the switching fabric. Lines of the data packet may also be transmitted during non-consecutive transmission cycles of the link between the line card and the switching fabric.

Line cards 204 through 208 are coupled to switching fabric 202 via one or more data links. In FIG. 2a, line card 204 is coupled to switching fabric 202 via downlink and uplink 228 and 230, respectively, line card 206 is coupled to switching fabric 202 via downlink and uplink 232 and 234, respectively, and line card 208 is coupled to switching fabric 202 via downlink and uplink 236 and 238, respectively. Data is transferred between line card 204 and end devices 210 through 214 via common bus 240, between line card 206 and end devices 216 through 220 via common bus 242, and between line card 208 and end devices 222 through 226 via common bus 244.

Figure 2B:
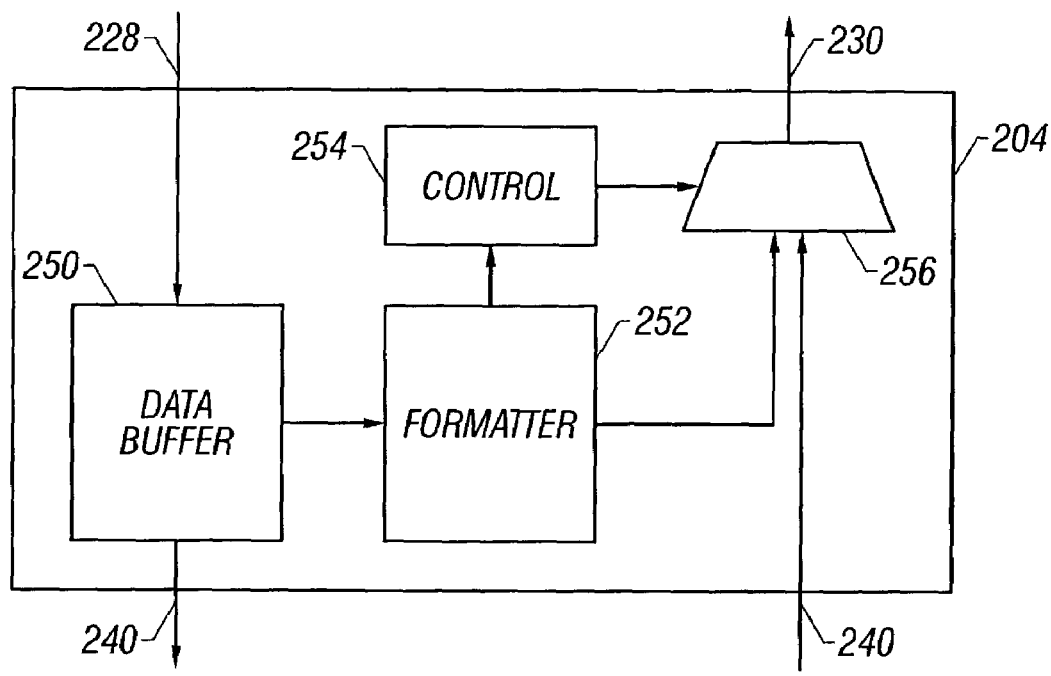

FIG. 2b illustrates one embodiment of line card 204. Line cards 206 and 208 may take similar form as that shown in FIG. 2b. In FIG. 2b, line card 204 includes a data buffer 250, a formatter 252, a control circuit 254, and a multiplexer 256.

Multiplexer 256 selectively couples an output of formatter 252 or common bus 240 to uplink 230 in response to a control signal generated by control circuit 254. Formatter 252 generates control codes to be transmitted to switching fabric 202. Although not shown, a separate formatter may be present in line card 204. The separate formatter may be provided to modify the contents of the first line of one or more data packets of a stream of packets received from common bus 240 before the data packets are transmitted to the fabric via multiplexer 256.

Control circuit 254 couples the output of formatter 252 to uplink 230 in response to formatter 252 generating a control code. Otherwise, control circuit 254 couples common bus 240 to uplink 230 thereby allowing data to be transmitted to switching fabric 202 with or without first line modification.

Common bus 240 may take form in a bi-directional bus. In this embodiment, a switch may be provided (not shown) for selectively coupling the data buffer 250 or the multiplexer 256 to the bi-directional bus. In the alternative, common bus 240 may take form in a pair of unidirectional buses respectively coupled to buffer 250 and multiplexer 256.

Data buffer 250 may take form in a FIFO buffer. Buffer 250 receives and stores data transmitted from switching fabric 202 via downlink 228. Data is stored within data buffer 250 prior to output on to common bus 240 for subsequent delivery to one of the end devices 210 through 214. Although not shown, a second buffer may be present in line card 204. The second buffer may store data packets received from common bus 240 before they are transmitted to fabric 202 via multiplexer.

Data buffer 250, in one embodiment, may include circuitry for generating information relating to the quantity of data stored therein. This information may be generated in any one of a number of different methods. For example, circuitry in buffer 250 may keep a running total of the data lines input to buffer and a running total of the data lines output from buffer 250. During each cycle of a system clock (not shown in FIG. 2*b*) the circuitry may subtract the running total of data lines output from the running total of data lines input, the difference provided to formatter 252 as q(t), the quantity of data lines stored in buffer 250 at time t. Alternatively, buffer 250 may provide the running totals to formatter 252 for subsequent calculation of q(t).

Formatter 252, in one embodiment, receives information relating to the quantity of data stored within buffer 250. For purposes of explanation, formatter 252 will be described as receiving q(t), the quantity of data lines in buffer 250 at time t. In one embodiment, formatter 252 receives q(t) with each cycle of the system clock provided to line card 204. In this embodiment, q(t) increases or decreases by no more than one data line per clock cycle. In another embodiment, q(t) may increase or decrease by more than one data line per clock cycle.

Formatter 252 is configured to generate a plurality of control codes for transmission to switching fabric 202 via multiplexer 256 and uplink 230. As will be more fully described below, one of the control codes, a variable data transmit rate control code (hereinafter referred to as variable-rate control code), is used to variably control the rate at which data is transmitted from switching fabric 202 for storage within data buffer 250. In contrast to the prior art described above, formatter 252, through generation and transmission of the variable-rate control code, may vary the rate at which data is transmitted to buffer 250. The rate may vary from a full data transmit rate to zero data transmit rate, and at rates therebetween. For example, formatter 252 may generate a variable-rate control code instructing switching fabric 202 to transmit data at 0%, 10%, 20%, ... 100% of the full rate.

Formatter 252 generates the variable-rate control code in response to receiving q(t). Accordingly, line card 204 may signal switching fabric 202 the status of its data buffer 250 by adjusting the rate at which data is transmitted to buffer 250 for storage therein. In one embodiment, the rates of the variable-rate control codes are fixed. In another embodiment, the rates of the variable-rate control codes may be changed. In this latter embodiment, the rates of the variable-rate control codes may be set by software operating in, for example, formatter 252.

Formatter 252 monitors the quantity of data stored within buffer 250 using q(t) provided therefrom. Although not shown in FIG. 2*b*, circuitry for monitoring buffer 250 in formatter 252 may take form in hardware, software, or a combination of hardware and software. Formatter 252, in one embodiment, compares q(t) against several programmable thresholds Q(1)-Q(n) during each cycle of the system clock provided to line card 204. Thresholds Q(1)-Q(n) are stored in one or more memories of formatter 252 and represent increasing quantities of data lines ranging from Q(1) equal to zero to Q(n) equal to a percentage (e.g., 98%) of the total amount of data lines capable of being stored in buffer 250. When q(t) increases to Q(x), one of the thresholds Q(1)-Q(n), then formatter 252 generates and sends a variable-rate control code to switching fabric 202 instructing it to slow the rate at which it transmits data for storage in buffer 250. For example, if Q(t) increases to Q(5), then formatter 252 generates and sends a variable-rate control code to switching fabric 202 instructing it to slow the rate at which it transmits data. Conversely, when q(t) decreases to Q(x), formatter 252 generates and sends a variable-rate control code to switching fabric 202 instructing it to increase the rate at which it transmits data for storage in buffer 250. For example, if q(t) decreases to Q(2), then formatter 252 generates and sends a variable-rate control code to switching fabric 202 instructing it to increase the rate at which it transmits data to buffer 250.

The foregoing presumes the embodiment where q(t) will increase or decrease by no more than one line of data per clock cycle. In the alternative embodiment where q(t) increases or decreases by more than one line of data per system clock cycle, formatter 252 may compare q(t) with ranges R(1)-R(n−1) of data line quantities in order to determine whether to adjust the rate at which data is transmitted to buffer 250. In this embodiment, the ranges R(1)-R(n−1) of data line quantities are defined by Q(1)-Q(n). More particularly, R(x) equates to the range of data lines between R(x) and R(x+1), with R(x+1) but not R(x) included therein.

When formatter 252 receives q(t), formatter compares q(t) with R(1)-R(n−1) to identify the range R(x) in which q(t) is contained. Formatter 252 compares the range in which q(t) is contained with the range in which q(t−1), the quantity of data lines in buffer 250 at the previous clock cycle, is contained. If ranges for q(t) and q(t−1) are different, then formatter 252 generates and sends a variable-rate control code to fabric 202 instructing it to increase or decrease the rate at which it sends data to buffer 250. For example, if the range in which q(t) is contained is greater than the range in which q(t−1) is contained, then formatter 252 generates and sends a variable-rate control code to fabric 202 instructing it to decrease the rate at which it sends data to buffer 250. If the range in which q(t) is contained is less than the range in which q(t−1) is contained, then formatter 252 generates and sends a variable-rate control code to fabric 202 instructing it to increase the rate at which it sends data to buffer 250. If the range in which q(t) is contained is the same as than the range in which q(t−1) is contained, then no variable-rate control code is generated and sent.

Before any variable-rate control code is sent to switching fabric 202, control 254 instructs multiplexer 256 to couple formatter 252 to uplink 230. Once the variable-rate control code is transmitted to fabric 202, control 254 instructs multiplexer to recouple uplink 230 to common bus 240.

In the method described above, the rate at which data is transmitted between switching fabric 202 and line card 204, may be decreased one or more times to arrive at the maximum sustainable level to accommodate, for example, a burst of locally switched traffic on bus 240 that causes data buffer 250 to fill quickly. It is noted that in this context, maximum sustainable level does not necessarily equate to 100% of the full transmit rate. In the example, when the local burst subsides, data can flow out of buffer 250 at a rate greater than the rate at which buffer 250 receives data, thereby lowering the quantity of data stored within data buffer 250. In response to receiving a lowered q(t), formatter 252 may generate one or more variable-rate control codes instructing switching fabric 202 to increase its data transmit rate one or more times. In this fashion, the data transmit rate is adjusted up to the maximum sustainable level.

In contrast to the prior art, should line card 204 be unable to accept data at high rates, the data transmit rate will quickly lower to a sustainable rate instead of continuously cycling the fabric with start/stop control codes. In this configuration no guess or permanent setting need be made as to the initial rate at which data is transferred to line card 204. Rather, as buffer 250 begins to backup with data, formatter 252 will send one or more variable-rate control codes to the switching fabric 202 instructing it to lower its data transmit rate one or more times. As the buffer 250 empties, formatter 252 will send one or more variable-rate control codes to switching fabric 202 instructing it to increase its data transmit rate one or more times.

Frequent generation and transmission of variable-rate control codes can reduce data throughput between fabric 202 and line card 204. To illustrate this problem, suppose Q(1)-Q(n) are fixed. Further suppose that q(t) increases to Q(5) in the embodiment where q(t) increases or decreases by no more than one line of data per clock cycle. In response, formatter 252 generates and sends a variable-rate control code instructing fabric 202 to decrease the rate at which it transmits data to buffer 250. Suppose at time t+1 a line arrives in buffer 250 which raises q(t+1) to Q(5)+1, and then one clock later at time t+2 a line is taken from buffer 250 which reduces q(t+2) back to Q(5). Because the quantity of data in buffer 250 decreases back to Q(5), formatter 252 will again generate and send a variable-rate control code instructing fabric to increase the rate at which it sends data to the buffer 250. Accordingly, formatter 252 sends two variable-rate control codes to fabric 202 within two clock cycles. One variable-rate control code was sent at time t when the quantity in buffer 250 hit the limit Q(5) from below, and another was sent at time t+2 when the quantity hit the limit Q(5) from above. During these two clock cycles, data cannot be transmitted from line card 204 to fabric 202. This problem also occurs in the embodiment where q(t) can increase or decrease by more than one line of data.

The formatter 252 of FIG. 2b may include circuitry and/or an algorithm which prevents frequent generation and transmission of variable-rate control codes to fabric 202 when the contents q(t) of buffer 250 oscillates around one of the predefined quantities Q(1)-Q(n). More particularly, formatter 252 may be configured to dynamically modify one of the programmed quantities Q(1)-Q(n) each time a variable-rate control code is generated and sent to fabric 202. Suppose that q(t) increases to Q(5) in the embodiment where q(t) increases or decreases by no more than one line of data per clock cycle. In addition to generating a variable-rate control code, formatter 252 decreases the value of the Q(x) that was just crossed by, for example, 3%. The actual amount of the change can be a programmable value. Suppose q(t) decreases to the value of Q(x). In addition to generating a variable-rate control code, formatter 252 would increase the value of the Q(x) that was just crossed by, for example, 3%. By changing the values of Q(1)-Q(n) in this fashion, formatter 252 eliminates the problem of frequently sending variable-rate control codes when q(t) oscillates around a set quantity of data lines. This solution to the problem described above works equally well in the embodiment where q(t) can increase or decrease by more than one data line per clock cycle. Suppose q(t) increases to be within range R(x+1). In addition to generating a variable-rate control code, formatter 252 decreases the value of Q(x+1) by, for example, 3%. Or, suppose q(t) decreases to be within range R(x+1). In addition to generating a variable-rate control code, formatter 252 would increase the value of Q(x) by, for example, 3%.

The present invention is described above as being embodied in line a card. The present invention should not be limited thereto. The present invention may be embodied in any device that has a buffer for temporarily storing data received from a transmitting device. For example, the present invention may be embodied in switching fabric 202. Although not shown in the figures, switching fabric 202 may include first, second, and third input FIFO buffers for receiving and storing data from line cards 204, 206, and 208, respectively. The first, second, and third input FIFO buffers may be capable of generating $q1(t)$, $q2(t)$, and $q3(t)$ representing the quantity data lines in the first, second, and third buffers, respectively, at time t. Switching fabric 202 may include first, second and third formatters configured receive $q1(t)$, $q2(t)$, and $q3(t)$, respectively, and configured to generate and send control codes, including variable-rate control codes, to line cards 204, 206, and 208, respectively in a fashion similar to the formatter 252 described in FIG. 2b. Since switching fabric 202 is coupled to line cards 204, 206, and 208 via downlinks 228, 232, and 236, respectively, two or more of the first, second, and third variable-rate control codes may be transmitted simultaneously.

The first, second, and third formatters employed in switching fabric 202 may store separate quantity values Q1(1)-Q1(n), Q2(1)-Q2(n), and Q3(1)-Q3(n) in their respective memories. For purposes of explanation, switching fabric 202 will be described as having one formatter that receives $q1(t)$, $q2(t)$, and $q3(t)$. In response to receiving $q1(t)$, $q2(t)$, and $q3(t)$, the fabric formatter is capable of generating and sending first, second, and third variable-rate control codes to line cards 204, 206, and 208, respectively, for variably controlling the rate at which line cards 204, 206, and 208 respectively transmit data to switching fabric 202 for storage in the first, second, and third buffers, respectively, of switching fabric 202. This fabric formatter stores in one or more of its memories three sets of quantity values Q1(1)-Q1(n), Q2(1)-Q2(n), and Q3(1)-Q3(n) corresponding to line cards 204, 206, and 208, respectively. Lastly, the fabric formatter is capable of adjusting Q1(1)-Q1(n), Q2(1)-Q2(n), and Q3(1)-Q3(n) upward or downward in the same fashion that formatter 252 adjusts Q(1)-Q(n) described above.

The fabric formatter of switching fabric 202, in a manner similar to formatter 252 described above, is capable of generating the first, second, and/or third variable-rate control codes after comparing q1(t), q2(t), and q3(t) against Q1(1)-Q1(n), Q2(1)-Q2(n), and Q3(1)-Q3(n), respectively. When q1(t), q2(t), or q3(t) increases to Q1(x), Q2(x), or Q3(x), respectively, then the fabric formatter generates and sends first, second, or third variable-rate control code to line cards 204, 206, or 208 respectively, instructing them to decrease the rate at which it transmits data for storage in the first, second, or third buffer, respectively, of switching fabric 202. Additionally, if q1(t), q2(t), or q3(t) increases to Q1(x), Q2(x), or Q3(x), respectively, the fabric formatter reduces the value of Q1(x), Q2(x), or Q3(x) by, for example, 3% to avoid frequent generation and transmission of first, second, or third variable-rate control codes if the value of q1(t), q2(t), or q3(t) hovers around a set number. Conversely, when q1(t), q2(t), or q3(t) decreases to Q1(x), Q2(x), or Q3(x), respectively, then the fabric formatter generates and sends first, second, or third variable-rate control code to line cards 204, 206, or 208 respectively, instructing them to increase the rate at which it transmits data for storage in the first, second, or third buffer, respectively, of switching fabric 202. Likewise, if q1(t), q2(t), or q3(t) decreases to Q1(x), Q2(x), or Q3(x), respectively, the fabric formatter increases the value of Q1(x), Q2(x), or Q3(x) by, for example, 3% to avoid frequent generation and transmission of first, second, or third variable-rate control codes if the value of q1(t), q2(t), or q3(t) hovers around a set number.

The foregoing presumes the embodiment where q1(t), q2(t), or q3(t) increases or decreases by no more than one line of data per clock cycle. In the alternative embodiment where q1(t), q2(t), or q3(t) increases or decreases by more than one line of data per system clock cycle, the fabric formatter of fabric 202 may compare q1(t), q2(t), or q3(t) with ranges R1(1)-R1(n−1), R2(1)-R2(n−1), or R3(1)-R3(n−1), respectively, of data line quantities in order to determine when first, second, or third variable-rate control codes are to be generated and sent to line cards 204, 206, or 208, respectively. In this embodiment, the ranges R1(1)-R1(n−1), R2(1)-R2(n−1), and R3(1)-R3(n−1), respectively, of data line quantities are defined by Q1(1)-Q1(n), Q2(1)-Q2(n), and Q2(1)-Q2(n), respectively. More particularly: R1(x) equates to the range of data lines between R1(x) and R1(x+1), with R1(x+1) but not R1(x) included therein; R2(x) equates to the range of data lines between R2(x) and R2(x+1), with R2(x+1) but not R2(x) included therein, and; R3(x) equates to the range of data lines between R3(x) and R3(x+1), with R3(x+1) but not R3(x) included therein.

When the fabric formatter receives q1(t), q2(t), and q3(t), the fabric formatter compares q1(t), q2(t), and q3(t) with R1(1)-R1(n−1), R2(1)-R2(n−1), and R3(1)-R3(n−1), respectively, to identify the range R1(x), R2(x), and R2(x) in which q1(t), q2(t), and q3(t) are respectively contained. The fabric formatter compares the ranges in which q1(t), q2(t), and q3(t) are contained with the respective ranges in which q1(t−1), q2(t−1), and q3(t−1) are contained. If the ranges for q1(t), q2(t), or q3(t) are different from the ranges for q1(t−1), q2(t−1), and q3(t−1), respectively, then the fabric formatter generates and sends first, second, or third variable-rate control codes to cards 204, 206, or 208, respectively, instructing them to increase or decrease the rate at which it sends data to fabric 202. For example, if the range in which q1(t) is contained is greater than the range in which q1(t−1) is contained, then the fabric formatter generates and sends a first variable-rate control code to card 204 instructing it to decrease the rate at which it sends data to fabric 202. If the range in which q1(t) is contained is less than the range in which q1(t−1) is contained, then the fabric formatter generates and sends a first variable-rate control code to card 204 instructing it to increase the rate at which it sends data to fabric 202. If the range in which q1(t) is contained is the same as than the range in which q1(t−1) is contained, then no first variable-rate control code is generated and sent.

Fabric 202 as shown in FIG. 2a may support two or more types of data transmission to the line cards. For example, switching fabric 202 may support high and low priority data traffic in a non-blocking manner where high priority traffic can pass low priority traffic. High priority traffic passing low priority traffic should not be limited to discrete packets. For example, suppose end device 222 (FIG. 2a) is sending low priority traffic to end device 210 via fabric 202 when end device 216 begins sending high priority traffic to end device 210 via fabric 202. Initially, fabric 202 chooses to send packets from line card 208 since no high priority traffic is being sent to end device 210. But, when the high priority traffic appears from end device 216, fabric 202 can interrupt a low priority packet sent from line card 222 and send the entire high priority packet from end device 216, then resume transmission of the low priority packet.

Figure 2C:
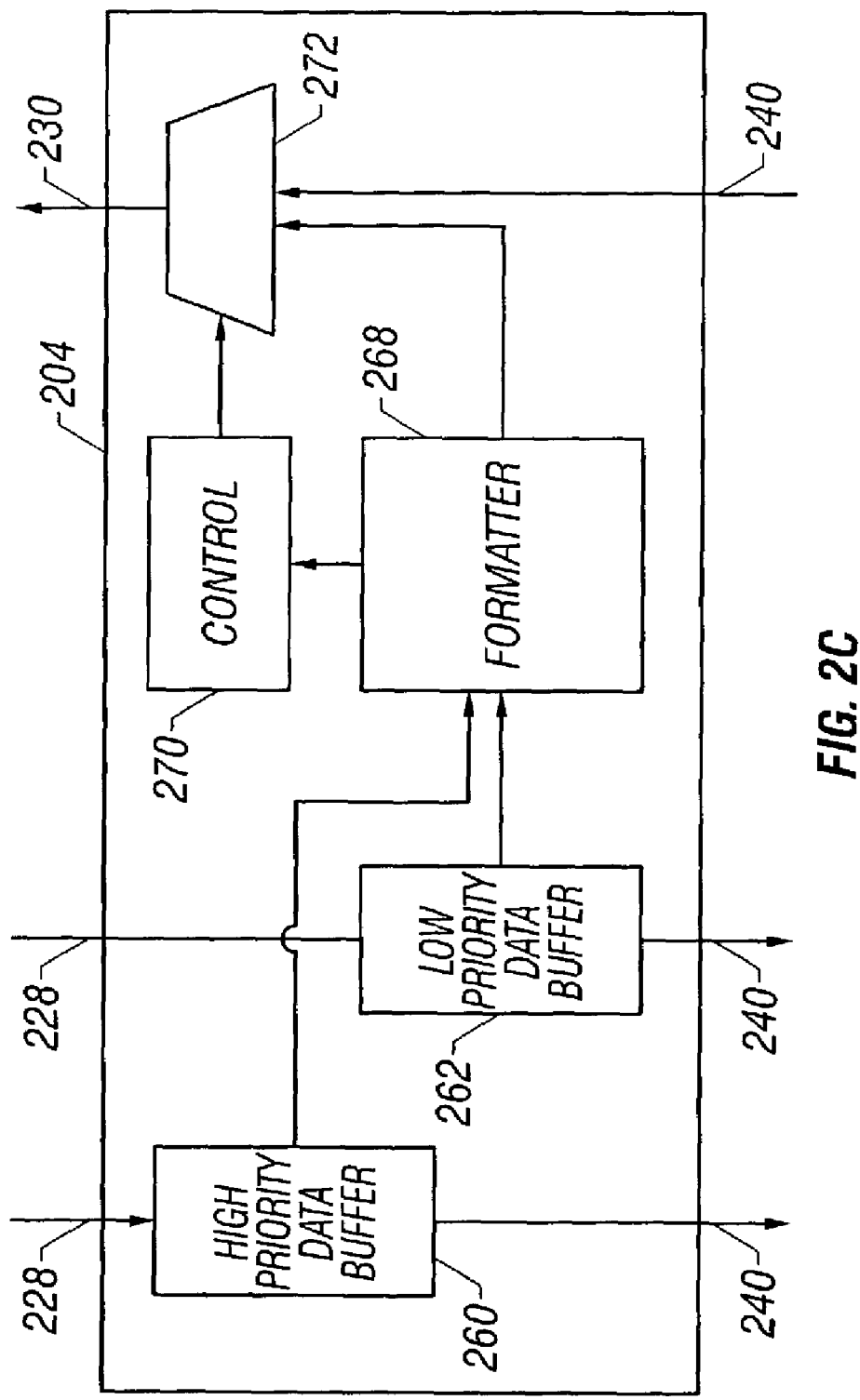

FIG. 2c shows a line card 204 that may find use in the system 200 shown in FIG. 2a. In contrast to the line card 204 shown in FIG. 2b, line card 204 shown in FIG. 2c includes two data buffers 260 and 262 which may be used to store distinct types of data transmitted from switching fabric 202. More particularly, data buffer 260 may be used to store data transmitted from switching fabric 202 having the high priority, while data buffer 262 may store data transmitted from switching fabric 202 having the low priority. It is noted that the line card shown in FIG. 2c may include further receiving buffers for storing data having priority which lies between the high and low priorities mentioned above.

Line card 204 shown in FIG. 2c includes a formatter 268 coupled to a control circuit 270 and multiplexer 272. Formatter 268 is configured to generate control codes, including high and low priority variable-rate control codes, for controlling operational aspects of the switching fabric 202. The high and low priority variable-rate control codes are used to control the rate at which high and low priority data is transmitted to the first data buffer 260 and second data buffer 262, respectively. Multiplexer 272, in response to control circuit 270, couples the output of formatter 268 to uplink 230 when formatter 268 generates one of its control codes. Otherwise, multiplexer 272 couples local bus 240 to uplink 230 so that data may be transmitted to switching fabric 202. Although not shown in FIG. 2c, line card 204 includes a switch for selectively coupling the inputs of buffers 260 and 262 to downlink 228 depending on whether data received by the switch is designated high priority or low priority.

In FIG. 2c, formatter 268 is configured to receive information relating to the quantity of data stored within the buffers 260 and 262. For purposes of explanation formatter 268 will be described as receiving qh(t) and q1(t) from buffers 260 and 262, respectively, where qh(t) and q1(t) represent the quantity of data lines stored in buffers 260 and 262, respectively, at time t, it being understood that formatter may be configured to generate qh(t) and q1(t) based on information provided by buffers 260 and 262. In response to receiving qh(t) and q1(t), formatter 268 compares qh(t) and q1(t) to programmable quantities QH(1)-QH(n) and QL(1)-QL(n), respectively. If qh(t) or q1(t) increases to QH(x) or QL(x), respectively, of QH(1)-QH(n) and QL(1)-QL(n), respectively, then formatter 268 generates and sends a high or low priority variable-rate control code to switching fabric 202, instructing it to decrease the rate at which it transmits high or low priority data for storage in buffer 260 or 262, respectively. Additionally, if qh(t) or q1(t) increases to QH(x) or QL(x), respectively, the formatter 268 reduces the value of the QH(x) or QL(x) for the threshold that was just crossed by, for example, 3% to avoid frequent generation and transmission of high or low variable-rate control codes if the value of qh(t) or q1(t) hovers around a set number. Conversely, when qh(t) or q1(t) decreases to QH(x) or QL(x), respectively, of QH(1)-QH(n) and QL(1)-QL(n), respectively, then formatter 268 generates and sends a high or low priority variable-rate control code to switching fabric 202, instructing it to increase the rate at which it transmits high or low priority data for storage in buffer 260 or 262, respectively. If qh(t) or q1(t) decreases to QH(x) or QL(x), respectively, the formatter 268 increases the value of QH(x) or QL(x) by, for example, 3% to avoid frequent generation and transmission of high or low variable-rate control codes if the value of qh(t) or q1(t) hovers around a set number.

Obviously, it is possible that qh(t) and q1(t) may both increase beyond or decrease to QH(x) or QL(x), respectively, around the same time. Line card 204 is coupled to switching fabric 202 by a single uplink 230. As a result, only one of the high and low priority variable-rate control codes may be transmitted to switching fabric 202 during a transmission cycle on uplink 230. In this situation, the formatter 268 may send the high and low priority variable-rate control codes in consecutive transmit cycles on uplink 230. Alternatively, where qh(t) and q1(t) both increase beyond or decrease below programmable thresholds QH(x) or QL(x), respectively, formatter 268 may generate and send a single control code that contains first and second variable-rate control codes, where the first control variable-rate code instructs fabric 202 to increase or decrease the rate at rate at which it transmits high priority data for storage in buffer 260, and where the second control variable-rate code instructs fabric 202 to increase or decrease the rate at rate at which it transmits low priority data for storage in buffer 262. This control word may be sent to the fabric in a single cycle thereby eliminating the need to send separate control codes in succeeding cycles.

Figure 3A:
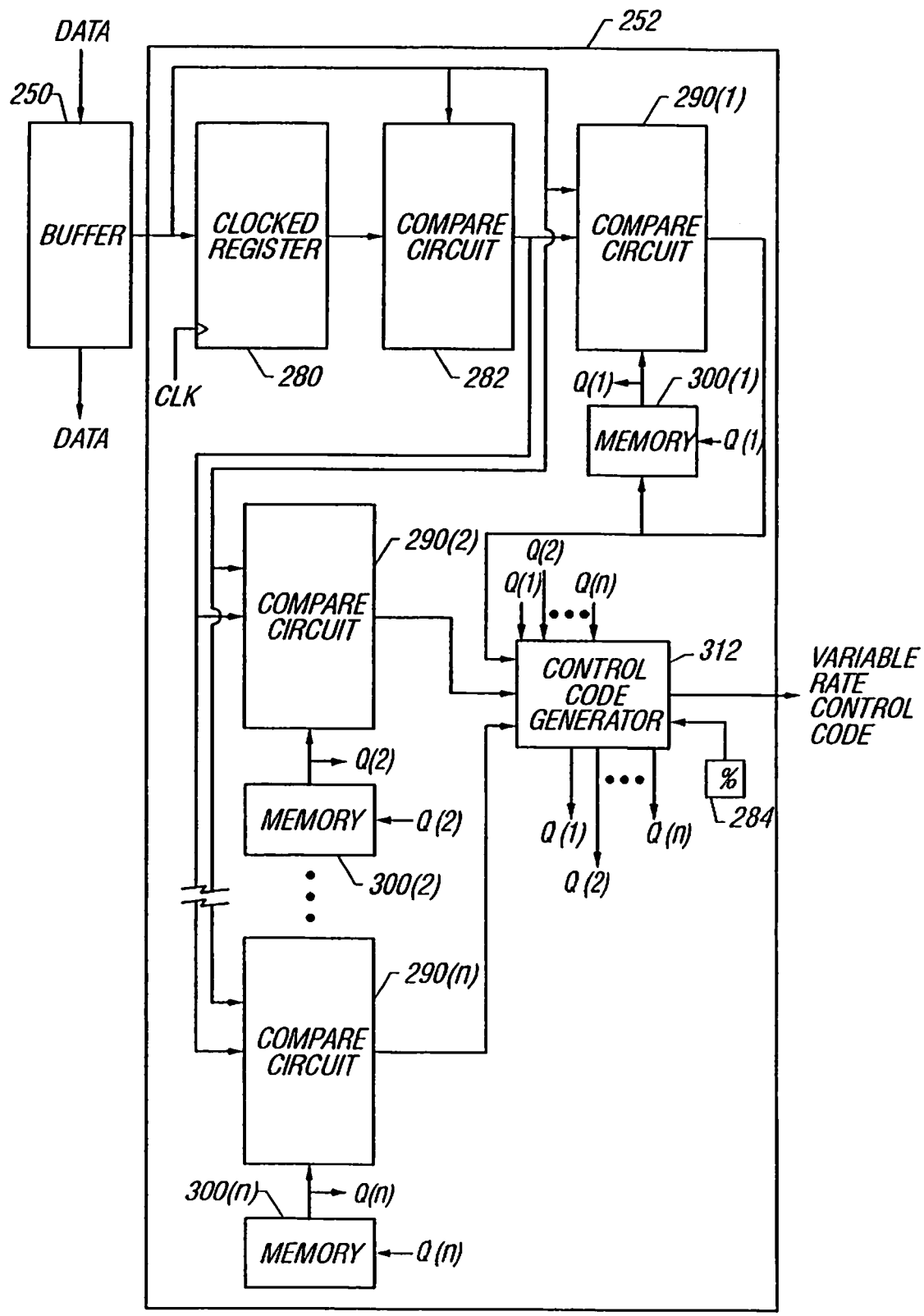

FIG. 3a illustrates relevant components of one embodiment of formatter 252 shown in FIG. 2b. It is noted that formatter 252 of FIG. 3a may include additional circuitry for performing other functions. Formatter 252 is shown to include a clocked register 280, compare circuit 282, memory 284, compare circuits 290(1)-290(n), memory devices 300(1)-300(n), and control code generator 312.

Figure 4A:
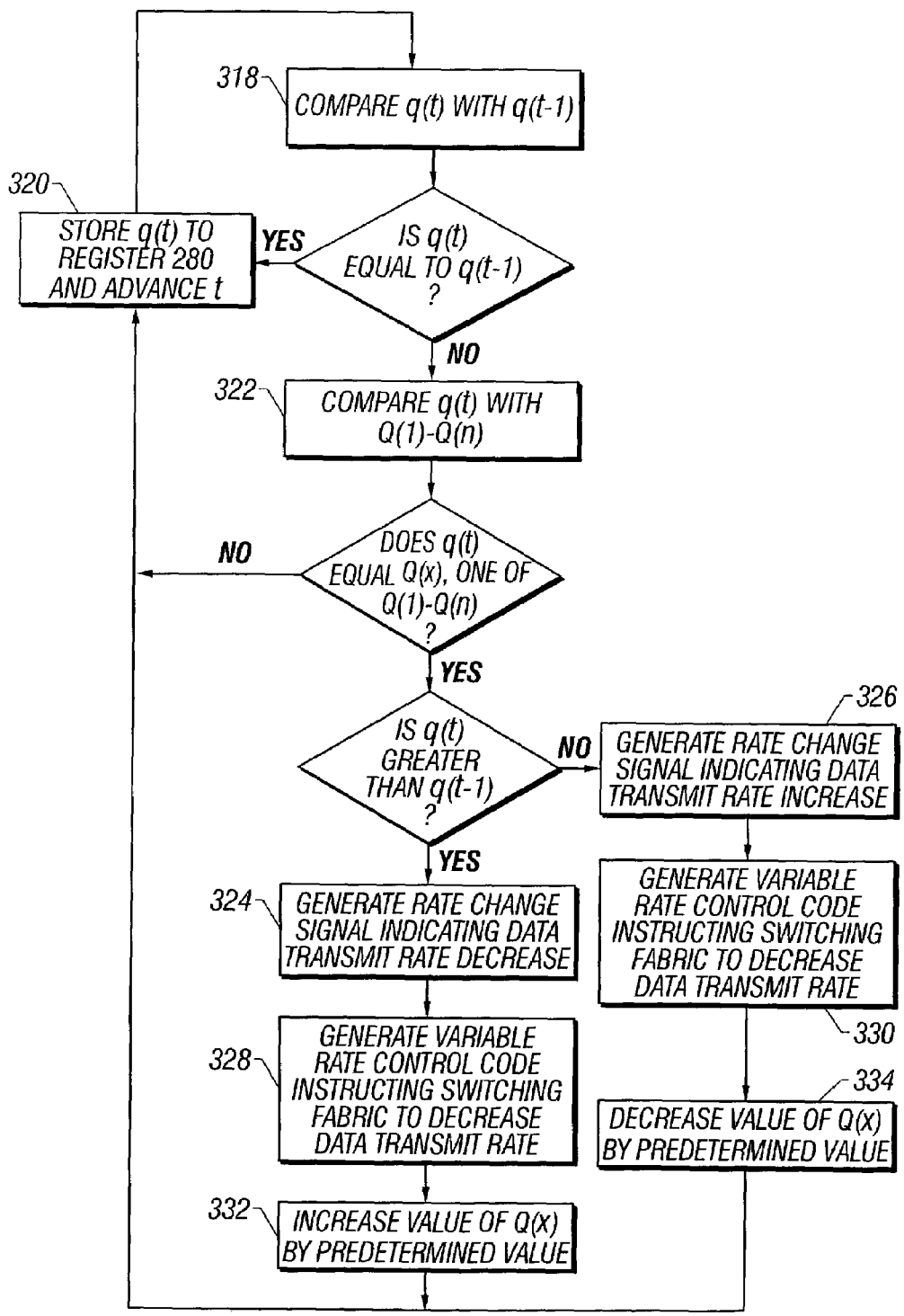

Operational aspects of formatter 252 of FIG. 3a will be described with reference to the flow chart shown in FIG. 4a. Q(t), the quantity of data stored in buffer 250 at time t, is provided to clocked register 280, compare circuit 282, and compare circuits 290(1)-290(n). Q(t) provided to formatter 252 of FIG. 3a increases or decreases by no more than one data line per clock cycle. The quantity of data stored in buffer 250 in the previous clock cycle t−1, is provided by clocked register 280 to compare circuit 282. At step 318, compare circuit 282 compares q(t) to q(t−1). If q(t) is equal to q(t−1), then the process ends with step 320 where q(t) is clocked into clocked register 280. However, if q(t) does not equal q(t−1), then, compare circuit 282 generates a signal, which is provided to compare circuits 290(1)-290(n), indicating that q(t) is either greater than or less than q(t−1).

The process proceeds to step 322, where compare circuits 290(1)-290(n) compare q(t) to thresholds Q(1)-Q(n), respectively, stored in memories 290(1)-290(n), respectively. If q(t) does not equal any of the thresholds Q(1)-Q(n), then the process ends with step 320. However, if q(t) equals one of the thresholds Q(1)-Q(n), then one of the compare circuits 290(1)-290(n) generates either a rate change signal indicating that the data transmit rate between line card 204 and switching fabric 202 should be increased or decreased depending on whether the signal provided by compare circuit 282 indicates q(t) is greater than q(t−1) or less than q(t−1), respectively. More particularly, when one of the compare circuits 290(x) detects equality between q(t) and its corresponding Q(x), compare circuit 290(x) generates the rate change signal indicating that the data transmit rate between line card 204 and switching fabric 202 should be increased if q(t) is greater than q(t−1) as shown in step 324 or decreased if q(t) is less than q(t−1) as shown in step 326, respectively.

The contents Q(1)-Q(n) of memories 300(1)-300(n), respectively, are provided to the control code generator 312. When compare circuit 290(x) indicates a match between q(t) and Q(x) and when compare circuit 282 indicates that q(t) is greater than or less than q(t−1) stored in clocked register 280, then control code generator 312 replaces the value of Q(x) with either Q(x) less the contents of memory 284 or Q(x) plus the contents of memory 284 depending on whether q(t) is greater than q(t−1) or q(t) is less than q(t−1), respectively, as shown in steps 332 or 334, respectively. For example, if compare circuit 282 indicates that q(t) is less than q(t−1), and compare circuit 290(2) indicates that q(t) is equal to Q(2) stored in memory 300(2), then control code generator 312 generates a new Q(2) which equals the previous Q(2) plus the contents of memory 284, and control code generator 312 stores the new Q(2) in memory 300(2). None of the other contents of memory 300(1) and 300(3)-300(n) are changed. It is noted that the new Q(2) is compared with q(t+1) in the next clock cycle t+1.

Control code generator 312 receives the rate change signal from one of the compare circuits 290(1)-290(n). Although not shown within the figures, control code generator 312 may include a programmable memory storing data transmit rate values TR(1)-TR(n) corresponding to the threshold values Q(1)-Q(n), respectively. Data transmit rate values TR(1)-TR(n) define differing rates for transmitting data between switching fabric 202 and line card 204. Data transmit rate values TR(1)-TR(n) vary between TR(1) which may equal the fullest possible rate at which data can be transmitted between switching fabric 202 and line card 204, to TR(n) which may equal zero transmission rate. Moreover, control code generator 312 is configured to "remember" the current transmit rate, i.e., the rate at which data is being transmitted between switching fabric 202 and line card 204 at time t. In one embodiment, control code generator 312 remembers the current transmit rate using a pointer pointing to one of the data transmit rate values TR(1)-TR(n). In this embodiment, the data transmit rate value currently being pointed to by the pointer at time t is defined as the current data transmit rate.

Figure 5:
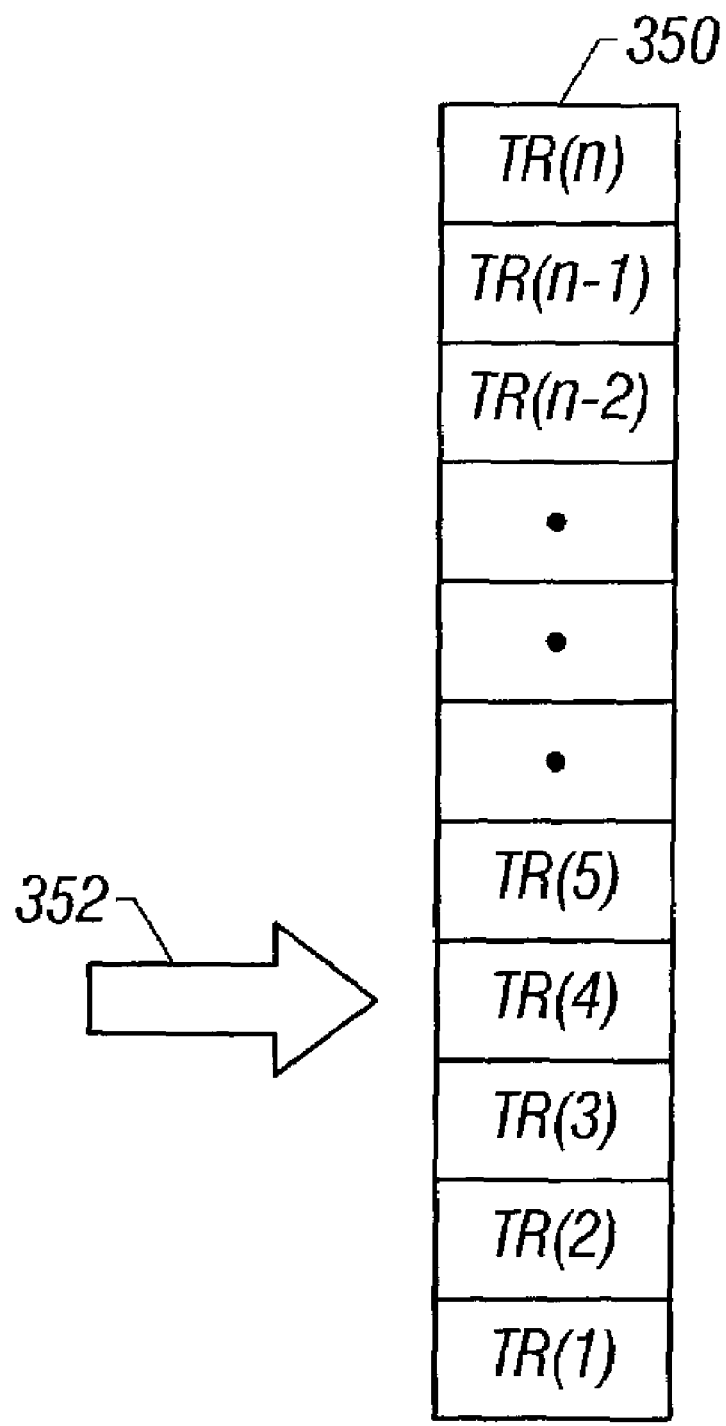
FIG. 5 illustrates a programmable memory for storing transmit rate values TR(1)-TR(n).

FIG. 5 illustrates, in block diagram form, an exemplary programmable memory 350 storing data transmit rate values TR(1)-TR(n) with a pointer 352 pointing to current data transmit rate TR(4). With continuing reference to FIGS. 3a and 4a, when control code generator 312 receives a rate change signal from one of the compare circuits 290(1)-290(n), control code generator, in one embodiment, moves the position of pointer 352 up one or down one position depending on whether signal from one of the compare circuits 290(1)-290(n) indicates that the data transmit rate should be increased or decreased, respectively. For example, if the rate change signal from one of the compare circuits 290(1)-290(n) indicates that the data transmit rate should be increased, then control code generator 312 moves the pointer 352 down to TR(3) in FIG. 5. If, on the other hand, the rate change signal from one of the compare circuits 290(1)-290(n) indicates that the data transmit rate should be decreased, then control code generator 312 moves the pointer 352 up to TR(5) in FIG. 5. Further, in response to receiving the rate change signal, control code generator 312 generates and sends a variable-rate control code to switching fabric 202 as shown in step 328 or 330 of FIG. 4a. This variable-rate control code includes the data transmit rate value (e.g., TR(3) or TR(5)) newly pointed to by pointer 352. Switching fabric 202 receives the variable-rate control code and adjusts the data transmission rate between it and the line card 204 in accordance with the data transmit rate value contained in the received variable-rate control code.

Figure 3B:
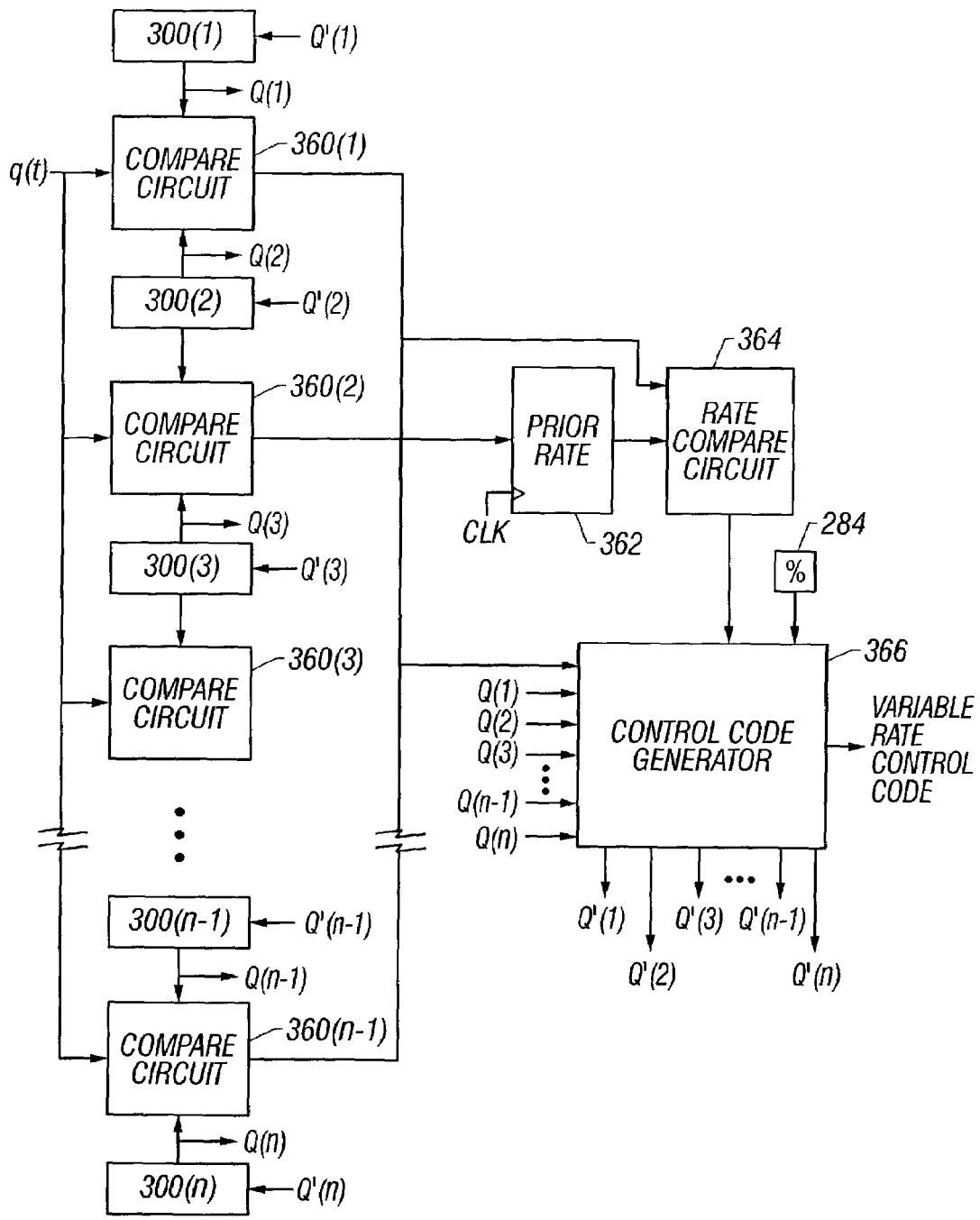

FIG. 3b shows another embodiment of the formatter 252 shown in FIG. 2b. It is noted that formatter 252 of FIG. 3b may include additional circuitry for performing other functions. Formatter 252 shown in FIG. 3b includes memory devices 300(1)-300(n), memory 284, range compare circuits 360(1)-360(n-1), a clocked register 362, compare circuit 364, and control code generator 366. Each of the compare circuits 360(1)-360(n-1) receive data line quantity values from two of the memories 300(1)-300(n) coupled thereto. Compare circuits 360(1)-360(n-1) store programmable data transmit rates TR(1)-TR(n-1), respectively. Control code generator 366 is coupled to memories 300(1)-300(n) and 284. Control code generator 366 is configured to selectively increase or decrease the contents of each of memories 300(1)-300(n) by the number of data lines stored in memory 284 as will be more fully described below.

Figure 4B:
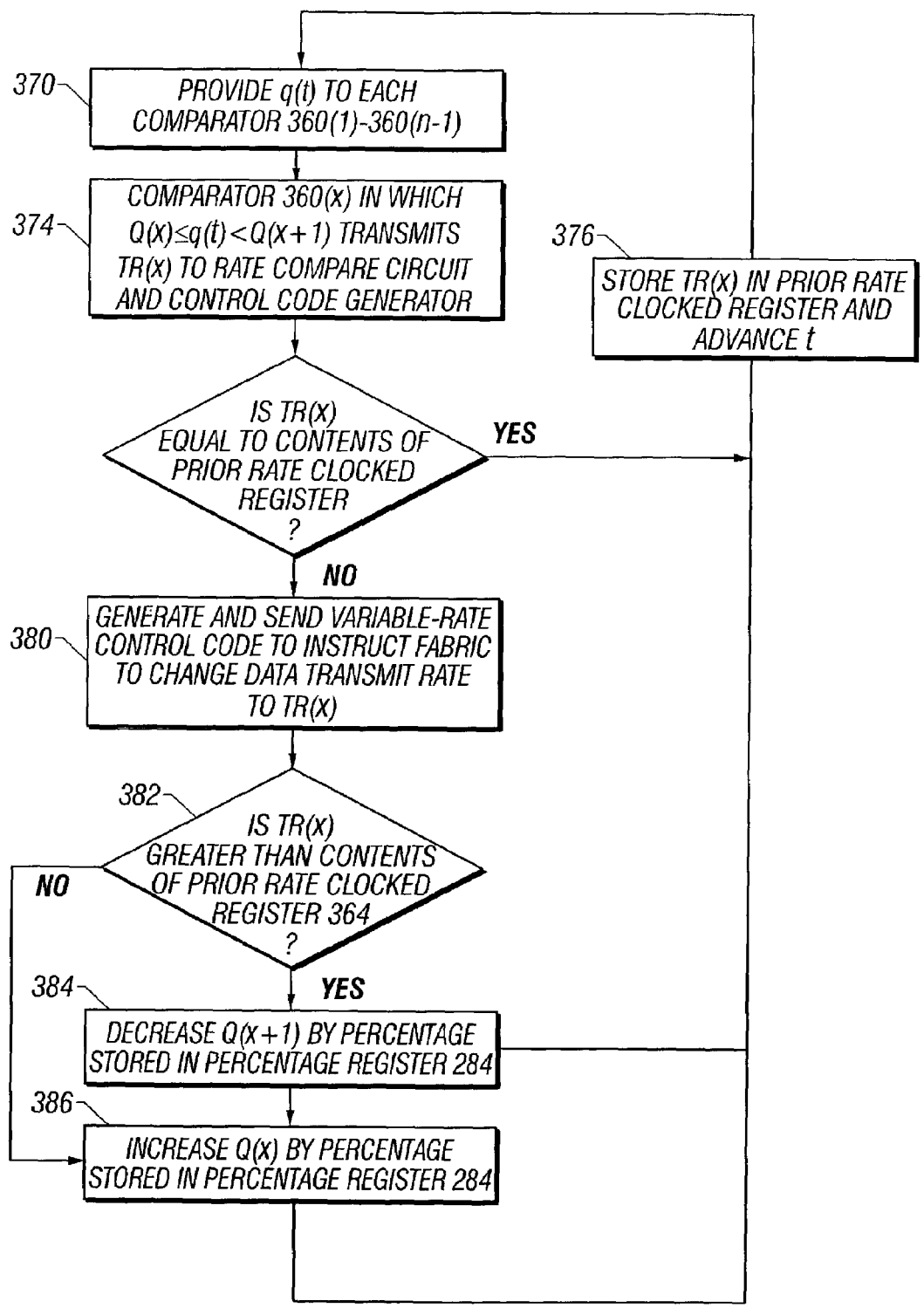
FIG. 4b is a flow chart illustrating operational aspects of the formatter shown in FIG. 3b.

Operational aspects of formatter 252 shown in FIG. 3b will be described with reference to the flow chart shown in FIG. 4b. At step 370, q(t) is provided to each of the range compare circuits 360(1)-360(n-1). The compare circuit 360 (x) that detects q(t) is greater than Q(x) (provided by memory 300(x)) and less than or equal to Q(x+1) (provided by memory 300(x+1)) transmits TR(x) to rate compare circuit 364 and to control code generator 366. Rate compare circuit compares the transmit rate TR(x) provided thereto with the transmit rate stored in clocked register 362. If the transmit rate stored in register 362 equals TR(x), than no variable-rate control code need be sent to fabric 202, and the process proceeds to step 376 where the system clock is advanced and TR(x) is stored in the clocked register 362. If, however, TR(x) does not equal the contents of clocked register 362, then a variable-rate control is generated by control code generator 366 and transmitted to fabric 202 a tstep 380. It is noted that this variable-rate control code includes TR(x) or a translation thereof.

Rate compare circuit determines whether TR(x) is greater or less than the transmit rate stored in clocked register 362. If TR(x) is greater than the transmit rate stored at time t in clocked register 362, than at step 384 control code generator decreases the value of Q(x+1) by the value in memory 284. If TR(x) is less than the transmit rate stored at time t in clocked register 362, than at step 384 control code generator increases the value of Q(x) by the value in memory 284.

The present invention may implemented as a computer readable medium storing instructions executable by a computer system to implement a method. In one embodiment, the method includes a first memory of the computer system receiving and storing data transmitted by a data transmitting device at a second data transmit rate during a first period of time, wherein the second data transmit rate is greater than a third data transmit rate but less than a first data transmit rate. The method also includes comparing g(t), a quantity of data in the first memory at time t, with first, second, third, and fourth data quantity values, wherein the second data quantity value is less than the third and fourth data quantity values, and wherein the third data quantity is less than the fourth data quantity value. The first memory receives and stores data transmitted by the transmitting device at the first data transmit rate during a second period of time if q(t) is determined to be less than the second, third and fourth data quantity values but greater than the first data quantity value, wherein the second period of time is subsequent to the first period of time. The first memory receives and stores data transmitted by the transmitting device at the third data transmit rate during the second period of time if q(t) is determined to be greater than the first second, and third data quantity values but less than the fourth data quantity value. The first memory receives and stores data transmitted by the transmitting device at the second data transmit rate during the second period of time if q(t) is determined to be greater than the first and second data quantity values but less than the third and fourth data quantity values. The second data quantity value is replaced in memory with a new second data quantity value if q(t) is determined to be less than the second, third and fourth data quantity values but greater than the first data quantity value. The third data quantity value is replaced in memory with a new third data quantity value if q(t) is determined to be greater than the first second, and third data quantity values but less than the fourth data quantity value.

Although the present invention have been described in connection with several embodiments, the invention is not intended to be limited to the specific forms set forth herein, but on the contrary, it is intended to cover such alternatives, modifications, and equivalents as can be reasonably included with in the spirit and scope of the invention as defined by the appended claims.

What is claimed is:

1. A method comprising:
   a first memory receiving and storing data transmitted by a data transmitting device at a second data transmit rate during a first period of time, wherein the second data transmit rate is greater than a third data transmit rate but less than a first data transmit rate;
   comparing q(t), a quantity of data in the first memory at time t, with first, second, third, and fourth data quantity values wherein first data quantity value is less than the second, third, and fourth data quantity values, wherein the second data quantity value is less than the third and fourth data quantity values, and wherein the third data quantity is less than the fourth data quantity value;
   the first memory receiving and storing data transmitted by the transmitting device at the first data transmit rate during a second period of time if q(t) is determined to be less than the second, third and fourth data quantity values but greater than the first data quantity value, wherein the second period of time is subsequent to the first period of time;
   the first memory receiving and storing data transmitted by the transmitting device at the third data transmit rate during the second period of time if q(t) is determined to be greater than the first, second, and third data quantity values but less than the fourth data quantity value;
   the first memory receiving and storing data transmitted by the transmitting device at the second data transmit rate during the second period of time if q(t) is determined to be greater than the first and second data quantity values but less than the third and fourth data quantity values;
   replacing the second data quantity value stored in memory with a new second data quantity value if q(t) is determined to be less than the second, third and fourth data quantity values but greater than the first data quantity value;

replacing the third data quantity value stored in memory with a new third data quantity value if q(t) is determined to be greater than the first second, and third data quantity values but less than the fourth data quantity value.

2. The method of claim 1 wherein the first memory comprises a FIFO buffer.

3. The method of claim 1 wherein the new second data quantity value is greater than the second data quantity value.

4. The method of claim 1 wherein the new second data quantity value is less than the second data quantity value.

5. The method of claim 1 wherein the new third data quantity value is less than the third data quantity value.

6. The method of claim 1 wherein the new third data quantity value is greater than the third data quantity value.

7. The method of claim 1 further comprising:
generating a first rate control signal if q(t) is determined to be less than the second, third and fourth data quantity values but greater than the first data quantity value;
sending the first rate control signal to the transmitting device transmitting, wherein the transmitting device stops transmitting data at the second data transmit rate and starts transmitting data at the first data transmit rate in response to receiving the first rate control signal;
generating a third rate control signal if q(t) is determined to be greater than the first, second, and third data quantity values but greater than the fourth data quantity value;
sending the third rate control signal to the transmitting device transmitting, wherein the transmitting device stops transmitting data at the second data transmit rate and starts transmitting data at the third data transmit rate in response to receiving the third rate control signal.

8. A apparatus comprising:
a first memory for receiving and storing data transmitted from a data transmitting device at a second data transmit rate during a first period of time, wherein the second data transmit rate is greater than a third data transmit rate but less than a first data transmit rate;
a memory for storing first, second, third, and fourth data quantity values, wherein the first data quantity value is less than the second, third, and fourth data quantity values, wherein the second data quantity value is less than the third and fourth data quantity values, and wherein the third data quantity value is less than the fourth data quantity value;
a first circuit configured receive and compare q(t), a quantity of data in the first memory at time t, with the first, second, third, and fourth data quantity values stored in the memory;
wherein the first circuit is configured to generate and send to the data transmitting device a first rate control signal if q(t) is determined to be less than the second, third and fourth data quantity values but greater than the first data quantity value, wherein the transmitting device transmits data to the first memory at the first data transmit rate for storage therein during a second period of time in response to receiving the first rate control signal, wherein the second period of time is subsequent to the first period of time;
wherein the first circuit is configured to generate and send to the data transmitting device a third rate control signal if q(t) is determined to be greater than the first, second, and third data quantity values but less than the fourth data quantity value, wherein the transmitting device transmits data to the first memory at the third data transmit rate for storage therein during the second period of time in response to receiving the third rate control signal;
wherein the first circuit is coupled to the memory and configured to replace the second data quantity value therein with a new second data quantity value if q(t) is determined to be less than the second, third and fourth data quantity values but greater than the first data quantity value;
wherein the first circuit is configured to replace the third data quantity value in the memory with a new third data quantity value if q(t) is determined to be greater than the first second, and third data quantity values but less than the fourth data quantity value.

9. The apparatus of claim 8 wherein the first memory comprises a FIFO buffer.

10. The apparatus of claim 8 wherein the new second data quantity value is greater than the second data quantity value.

11. The apparatus of claim 8 wherein the new second data quantity value is less than the second data quantity value.

12. The apparatus of claim 8 wherein the new third data quantity value is less than the third data quantity value.

13. The apparatus of claim 8 wherein the new third data quantity value is greater than the third data quantity value.

14. The apparatus of claim 8 further comprising the transmitting device.

15. The apparatus of claim 14 wherein the transmitting device is contained in a switching fabric, wherein the first memory is contained in a line card coupled to the switching fabric via a data link, and wherein the transmitting device transmits data via the data link to the first memory for storage therein.

16. A computer readable medium storing instructions executable by a computer system to implement a method, the method comprising:
a first memory of the computer system receiving and storing data transmitted by a data transmitting device at a second data transmit rate during a first period of time, wherein the second data transmit rate is greater than a third data transmit rate but less than a first data transmit rate;
comparing q(t), a quantity of data in the first memory at time t, with first, second, third, and fourth data quantity values, wherein the second data quantity value is less than the third and fourth data quantity values, and wherein the third data quantity is less than the fourth data quantity value;
the first memory receiving and storing data transmitted by the transmitting device at the first data transmit rate during a second period of time if q(t) is determined to be less than the second, third and fourth data quantity values but greater than the first data quantity value, wherein the second period of time is subsequent to the first period of time;
the first memory receiving and storing data transmitted by the transmitting device at the third data transmit rate during the second period of time if q(t) is determined to be greater than the first second, and third data quantity values but less than the fourth data quantity value;
the first memory receiving and storing data transmitted by the transmitting device at the second data transmit rate during the second period of time if q(t) is determined to be greater than the first and second data quantity values but less than the third and fourth data quantity values;

replacing the second data quantity value in memory with a new second data quantity value if q(t) is determined to be less than the second, third and fourth data quantity values but greater than the first data quantity value;

replacing the third data quantity value in memory with a new third data quantity value if q(t) is determined to be greater than the first second, and third data quantity values but less than the fourth data quantity value.

17. The computer readable medium of claim 16 wherein the new second data quantity value is greater than the second data quantity value.

18. The computer readable medium of claim 16 wherein the new second data quantity value is less than the second data quantity value.

19. The computer readable medium of claim 16 wherein the new third data quantity value is less than the third data quantity value.

20. The computer readable medium of claim 16 wherein the new third data quantity value is greater than the third data quantity value.

21. A apparatus comprising:

a memory for receiving and storing data transmitted from a data transmitting device at a second data transmit rate during a first period of time, wherein the second data transmit rate is greater than a third data transmit rate but less than a first data transmit rate;

first, second, third, and fourth memories for storing first, second, third, and fourth data quantity values, respectively, wherein the first data quantity value is less than the second, third, and fourth data quantity values, wherein the second data quantity value is less than the third and fourth data quantity values, and wherein the third data quantity is less than the fourth data quantity value;

a circuit configured receive and compare q(t), a quantity of data in the memory at time t, with the first, second, third, and fourth data quantity values stored in the first, second, third, and fourth memories, respectively;

wherein the circuit is configured to generate and send to the data transmitting device a first rate control signal if q(t) is determined to be less than the second, third and fourth data quantity values but greater than the first data quantity value, wherein the transmitting device transmits data to the memory at the first data transmit rate for storage therein during a second period of time in response to receiving the first rate control signal, wherein the second period of time is subsequent to the first period of time;

wherein the circuit is configured to generate and send to the data transmitting device a third rate control signal if q(t) is determined to be greater than the first, second, and third data quantity values but less than the fourth data quantity value, wherein the transmitting device transmits data to the memory at the third data transmit rate for storage therein during the second period of time in response to receiving the third rate control signal;

wherein the circuit is coupled to the second memory and configured to replace the second data quantity value therein with a new second data quantity value if q(t) is determined to be less than the second, third and fourth data quantity values but greater than the first data quantity value;

wherein the circuit is coupled to the third memory and configured to replace the third data quantity value therein with a new third data quantity value if q(t) is determined to be greater than the first second, and third data quantity values but less than the fourth data quantity value.

22. A apparatus comprising:

a memory for receiving and storing data transmitted from a data transmitting device at a second data transmit rate during a first period of time, wherein the second data transmit rate is greater than a third data transmit rate but less than a first data transmit rate;

first, second, third, and fourth memories for storing first, second, third, and fourth data quantity values, respectively, wherein the first data quantity value is less than the second, third, and fourth data quantity values, wherein the second data quantity value is less than the third and fourth data quantity values, and wherein the third data quantity is less than the fourth data quantity value;

a means for receiving and comparing q(t), a quantity of data in the memory at time t, with the first, second, third, and fourth data quantity values stored in the first, second, third, and fourth memories, respectively;

wherein the means is configured to generate and send to the data transmitting device a first rate control signal if q(t) is determined to be less than the second, third and fourth data quantity values but greater than the first data quantity value, wherein the transmitting device transmits data to the memory at the first data transmit rate for storage therein during a second period of time in response to receiving the first rate control signal, wherein the second period of time is subsequent to the first period of time;

wherein the means is configured to generate and send to the data transmitting device a third rate control signal if q(t) is determined to be greater than the first, second, and third data quantity values but less than the fourth data quantity value, wherein the transmitting device transmits data to the memory at the third data transmit rate for storage therein during the second period of time in response to receiving the third rate control signal;

wherein the means is coupled to the second memory and configured to replace the second data quantity value therein with a new second data quantity value if q(t) is determined to be less than the second, third and fourth data quantity values but greater than the first data quantity value;

wherein the means is coupled to the third memory and configured to replace the third data quantity value therein with a new third data quantity value if q(t) is determined to be greater than the first second, and third data quantity values but less than the fourth data quantity value.

23. A apparatus comprising:

a memory for receiving and storing data transmitted from a data transmitting device at a second data transmit rate during a first period of time, wherein the second data transmit rate is greater than a third data transmit rate but less than a first data transmit rate;

first, second, third, and fourth memories for storing first, second, third, and fourth data quantity values, respectively, wherein the first data quantity value is less than the second, third, and fourth data quantity values, wherein the second data quantity value is less than the third and fourth data quantity values, and wherein the third data quantity is less than the fourth data quantity value;

a means for receiving and comparing q(t), a quantity of data in the memory at time t, with the first, second, third, and fourth data quantity values stored in the first, second, third, and fourth memories, respectively;

wherein the means is configured to generate and send to the data transmitting device a first rate control signal if $q(t)$ is determined to be less than the second, third and fourth data quantity values but greater than the first data quantity value, wherein the transmitting device transmits data to the memory at the first data transmit rate for storage therein during a second period of time in response to receiving the first rate control signal, wherein the second period of time is subsequent to the first period of time;

wherein the means is configured to generate and send to the data transmitting device a third rate control signal if $q(t)$ is determined to be greater than the first, second, and third data quantity values but less than the fourth data quantity value, wherein the transmitting device transmits data to the memory at the third data transmit rate for storage therein during the second period of time in response to receiving the third rate control signal;

wherein the means is coupled to the second memory and configured to replace the second data quantity value therein with a new second data quantity value if $q(t)$ is determined to be less than the second, third and fourth data quantity values but greater than the first data quantity value;

wherein the means is coupled to the third memory and configured to replace the third data quantity value therein with a new third data quantity value if $q(t)$ is determined to be greater than the first second, and third data quantity values but less than the fourth data quantity value.

* * * * *